United States Patent [19]

Schwarz

[11] 4,368,565
[45] Jan. 18, 1983

[54] GROOVED ROLLER ASSEMBLY FOR LATERALLY STRETCHING FILM

[75] Inventor: Eckhard C. A. Schwarz, Neenah, Wis.

[73] Assignee: Biax-Fiberfilm Corporation, Neenah, Wis.

[21] Appl. No.: 890,995

[22] Filed: Mar. 28, 1978

[51] Int. Cl.³ .............................................. D06C 3/06
[52] U.S. Cl. ..................................... 26/99; 264/290.2
[58] Field of Search .................... 26/87, 99; 29/121.6, 29/121.5; 264/287, 288, 289, 290.2; 425/369; 83/664; 223/32

[56] References Cited

U.S. PATENT DOCUMENTS

| | | | |
|---|---|---|---|
| 392,484 | 11/1888 | Zdziarski | 29/121.6 |
| 1,732,968 | 10/1929 | Dwight | 26/87 |
| 1,939,246 | 12/1933 | Antonsen | 83/664 X |
| 2,613,571 | 10/1952 | Herman | 83/664 UX |
| 3,466,358 | 9/1969 | Muller | 264/287 |
| 3,528,145 | 9/1970 | Troope et al. | 26/87 |
| 3,795,031 | 3/1974 | Fleissner | 26/18.5 |
| 3,849,526 | 11/1974 | Muller et al. | 264/289 X |

FOREIGN PATENT DOCUMENTS

| | | | |
|---|---|---|---|
| 89315 | 10/1896 | Fed. Rep. of Germany | 26/99 |
| 94520 | 10/1897 | Fed. Rep. of Germany | 26/99 |
| 2503775 | 8/1976 | Fed. Rep. of Germany | 26/99 |
| 1091372 | 10/1954 | France | 83/664 |
| 424 | of 1866 | United Kingdom | 26/99 |
| 5621 | of 1886 | United Kingdom | 26/99 |
| 315732 | 12/1971 | U.S.S.R. | 26/99 |

*Primary Examiner*—Robert Mackey
*Attorney, Agent, or Firm*—Louis E. Marn; Elliot M. Olstein

[57] ABSTRACT

There is disclosed a novel groove roller and roller assembly comprised of two of such grooved rollers wherein the grooved roller is comprised of a plurality of discs having varying diameters and positioned on a shaft thereby forming a grooved roller of self-centering groove components. In a preferred embodiment, discs of one diameter and discs of another diameter are alternately mounted on the shaft. Also disclosed is a roller assembly formed of two of such grooved rollers in interdigitating or intermeshing relationship for laterally stretching incremental portions of an orientable thermoplastic substrate by introducing such substrate into a nip formed by such interdigitating grooved rollers whereby the velocity of introduction thereof is controlled to substantially the rotational velocity of such grooved rollers.

9 Claims, 5 Drawing Figures

GROOVED ROLLER ASSEMBLY FOR LATERALLY STRETCHING FILM

This invention relates to a novel grooved roller and to an improved roller assembly thereof, and more particularly to a novel grooved roller and an improved roller assembly comprised of such grooved rollers for stretching orientable thermoplastic substrates.

BACKGROUND OF THE INVENTION

In co-pending U.S. application Ser. No. 563,623 now abandoned assigned to the same assignee as the present invention, there is disclosed an apparatus for stretching a nonwoven web of orientable polymeric material in a station provided with a set of grooved rollers wherein the grooved pattern of the rolls is generally of a sinosoidal wave. In accordance with such co-pending application, the web of synthetic material is stretched in a manner to effect uniform stretching between the bonding points of each individual fiber thereby producing a web of larger dimension in the direction of stretch.

In co-pending application Ser. No. 614,018, now U.S. Pat. No. 4,116,892 granted Sept. 26, 1978 which is a continuation-in-part of the aforementioned application and assigned to the same assignee as the present invention, there is disclosed a process for stretching a substrate of synthetic thermoplastic material selected from the group consisting of a thermoplastic orientable polymer or a blend of a thermoplastic orientable polymer in which there is admixed an incompatible second phase selected from the group consisting of a group of an incompatible polymer or inorganic material. The substrate is stretched in grooved roller pairs by controlling the velocity of introduction of the substrate to maintain the velocity substantially identical to the surface velocity of the roller pair. In accordance with such invention, the blend is stretched to produce an opaque, low density porous sheet.

In both such applications, the grooved roller was manufactured out of a single piece of metal with the grooves being machined into the surface thereof by lathing or embossing processes. While the grooves of each roller initially were perfectly intermeshed when juxtapositioning two of such rollers as a roller assembly in a stretching apparatus, it was noted that distortions resulted after diverse periods of operation. Apparently, certain portions of the grooves became slightly out of register possibly due to irregular stress releases in the metal of the roller sets, or to differences in temperature causing differences in thermal expansion. In the event of very fine stretching grooves (distance between grooves of 0.040 inch or finer), temperature differences of less than 1° C. seem to effect sufficient distortion from one end of a roller to the other, particularly in roller lengths of greater than 40 inches, to cause serious operating problems.

As more clearly hereinafter discussed, while substrates may be uniformly stretched in areas of the roller assembly where intermeshing is perfect, other areas of the surface of the roller assembly may lead to distortion after a period of operation resulting in a cutting action as the roller nip closes. It is believed that a distortion of about 0.001 inch causes sufficient problems of cutting of the substrate being treated to render the resulting product worthless, particularly when using rollers formed with very fine stretching grooves.

OBJECTS OF THE INVENTION

It is an object of the present invention to provide a novel grooved roller.

Another object of the present invention is to provide an improved roller assembly for stretching orientable thermoplastic substrates.

Still another object of the present invention is to provide an improved roller assembly comprised of a roller set of such grooved rollers including means for controlling the velocity of introduction of such a substrate into a nip of such grooved rollers.

Still another object of the present invention is to provide an improved roller assembly for laterally stretching incremental portions of an orientable thermoplastic substrate.

SUMMARY OF THE INVENTION

These and other objects of the present invention are achieved by a novel grooved roller comprised of discs of one diameter and discs of another diameter mounted on a shaft in a manner to permit a continuous self-centering action thereof. In a preferred embodiment, the discs are alternately mounted on the shaft.

In another embodiment of the present invention, two of such grooved rollers are placed in interdigitating or intermeshing relationship together with means to control the velocity of introduction of a substrate into the nip of such intermeshing grooved rollers substantially identical to the surface velocity thereof to thereby laterally stretch incremental portions of the substrate.

BRIEF DESCRIPTION OF THE DRAWINGS

The invention will be more clearly understood by reference to the following detailed description of an exemplary embodiment thereof in conjunction with the accompanying drawings wherein.

DETAILED DESCRIPTION OF THE INVENTION

Drive and support assemblies, timing and safety circuits and the like known and used by those skilled in the art have been omitted in the interest of clarity.

Figure 1:
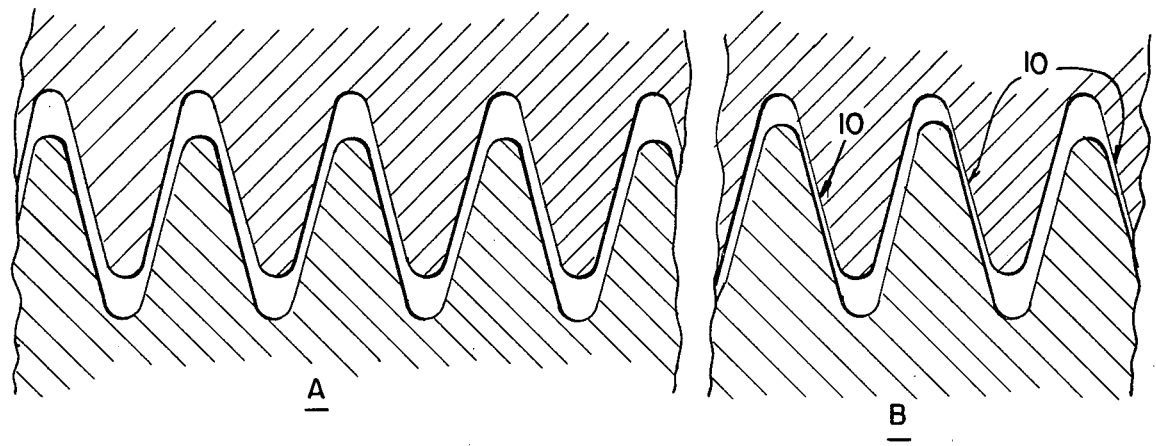
FIG. 1 is an enlarged view of an interdigitating or intermeshing roller set of the prior art.

FIG. 1A illustrates an enlarged view of an intermeshing roller set, such as discussed in the aforementioned co-pending applications wherein a substrate is uniformly stretched in areas where such intermeshing relationship is perfect, whereas, as hereinabove discussed, another area of the roll surfaces, i.e., FIG. 1B illustrates an area of distortion between the roller sets which can result in a cutting action at points 10 as the roll nip closes. It is believed a distortion of about 0.001 inch may cause sufficient problems to produce a worthless product which may be obviously aggravated in proportion to the use of longer width rollers in wider production lines.

Figure 2:
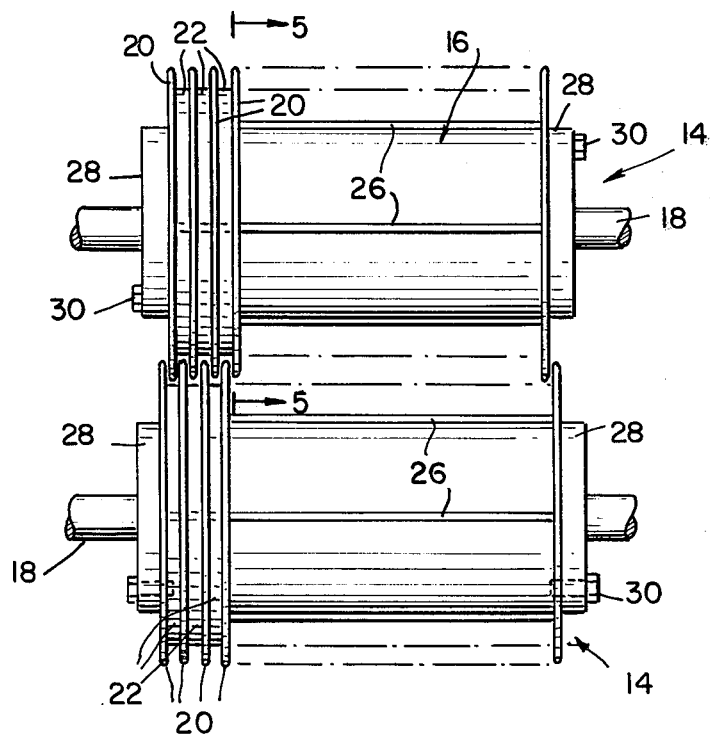
FIG. 2 is a schematic front elevational view of the improved roller assembly including novel grooved rollers and is one embodiment of the present invention.
Figure 3:
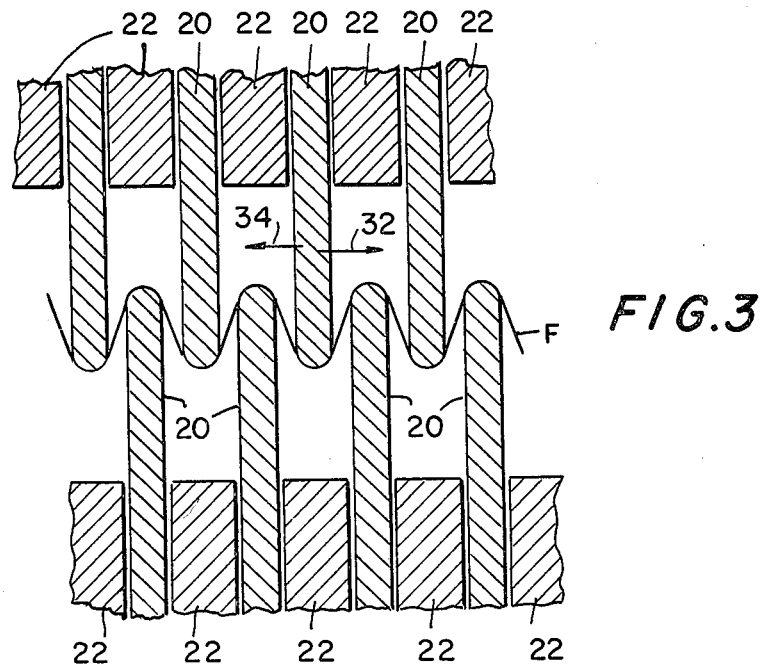
FIG. 3 is an enlarged view of a substrate passing through the roller assembly of the present invention.
Figure 5:
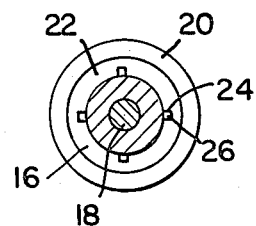
FIG. 5 is a reduced cross-sectional view of a grooved roller taken along the lines 5—5 of FIG. 2.

Referring to FIGS. 2, 3 and 5, there is illustrated an improved roller assembly, generally indicated as 12, comprised of novel grooved rollers, each groove roller generally indicated as 14. The grooved roller assembly 14 is comprised of a mandrel 16 fixedly mounted on a shaft 18. On the mandrel 16, in a preferred embodiment of the grooved roller 14, there are positioned discs or washer-like elements of one diameter 20 and discs or other-like elements 22 of a different diameter. The discs 20 and 22 are formed of metal and with slots 24 which are positioned in co-incidence with keys 26 formed on the mandrel 16 and are held on the mandrel 16 by end collar members 28 affixed to the ends of the mandrel 16, such as by bolts 30.

Generally, the larger diameter discs 20 are thinner than the discs 22 to permit free intermeshing of the stretching grooves thus formed between grooved rollers 14 forming the roller assembly 12. To permit the thus formed stretching grooves to be self-centering, the discs or members 20 and 22 are alternately placed on the mandrel 16 with the discs first being clamped tightly by the collar members 28 and the collar members 28 being subsequently pulled back by a small amount to permit the discs to be in somewhat loosened state on the mandrel 16. In this manner, i.e., permitting the discs to be in a loosened state, the discs are permitted to travel to or deflect to the right or left by a small amount depending on which side, pressure is being exerted.

Referring to FIG. 3, a substrate F is being laterally stretched whereby the stretching tension generated in the substrate F would be balanced by forces indicated by the arrows 32 and 34, respectively, exerted on a large disc 20 of one grooved roller 14 in such a way that the disc 20 is caused to be centered between the large discs 20 of the opposite grooved roller 14. Consequently, a misalignment would not occur, such as illustrated in FIG. 1A thereby substantially eliminating any cutting problem.

Figure 4:
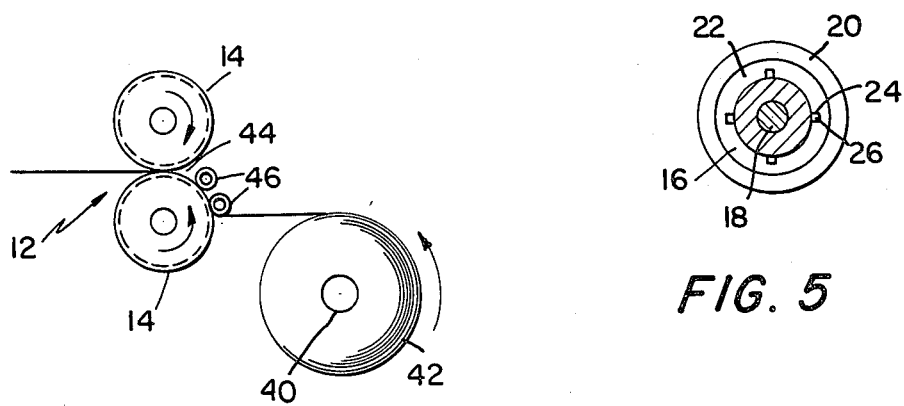
FIG. 4 is a schematic side elevational view of the roller stretching assembly of the present invention.

Referring now to FIG. 4 illustrating one station of an apparatus of the present invention, there is provided a supply roll 40 on which is mounted substrate 42 of a synthetic orientable thermoplastic material. The substrate 42 is coursed between a nip 44 of the roller assembly 12 as hereinabove discussed thereby forming a plurality of stretching grooves perpendicular to the axis of the rollers 14. The substrate 42 is caused to be maintained against the lower grooved roller 14 by a pair of press rollers 46 to control the velocity of the substrate 42 being introduced into the nip to be substantially identical to that of the surface velocity of the grooved rollers 14 thereby to cause the substrate 42 to assume the shape of the stretching grooves and thereby stretched by a factor determined in accordance with applicant's hereinabove mentioned co-pending applications. The substrate 42 is thereby prevented from slipping within the stretching grooves by the press rollers 46 to prevent introduction of more material, as is more commonly practiced in the corrugating art. Accordingly, the substrate being treated is caused to be laterally stretched by incremental portions by deflection of the substrate 42 into the shape of the stretching grooves as a result of the intermeshing of the grooved rollers 14 of the roller assembly 12. The crimped pattern may be flattened out by stretching the sheets laterally by means of tenter-clamps or curved Mount Hope rolls, such as those known and used in the art.

EXAMPLE OF THE INVENTION

The following is illustrative of a roll assembly 12 formed of grooved rollers of the present invention. A 4 in. diameter mandrel is mounted on an 18 in. shaft. Three large discs having an outside diameter of 6 in., an inside diameter of 4.005 in. and disc thickness of 0.022 in. are alternately mounted between 4 smaller discs mounted on the mandrel, the small discs having an outside diameter of 5.850 in., an inside diameter of 4.005 in. and a disc thickness of 0.035 in. A substrate having a thickness of 1 to 8 mils is stretched between an intermeshing roller assembly with no cutting of the substrate experienced as compared to grooves formed by machining into the surface of solid metal.

The smaller discs may be replaced with discs of a compressable elastomer, such as rubber or like which will also permit the larger discs to self-center during stretching of the substrate.

It will be appreciated by one skilled in the art that the number of discs and diameters may be varied depending upon the desired end result. Thus, instead of having alternating discs of larger and smaller diameter, there may be a disc protocol resulting in one large disc—two small discs, etc. in a re-occurring pattern. It is further contemplated to provide a disc protocol comprised of discs of diameter sizes of more than two in a re-occurring pattern. Further, to effect self-centering, the disc contacting the substrate within the stretching groove must rotate wherein the smaller discs need not, however, such an assembly is believed to be subject to excessive wear. Thus, in the disclosed embodiment both the large and small discs are keyed, or in some equivalent manner, fixedly positioned on the mandrel 16. It is further understood that the mounting assembly, i.e., mandrel and shaft may be formed of a single casted or machined body.

While the invention has been described in connection with an exemplary embodiment thereof, it will be understood that many modifications will be apparent to those of ordinary skill in the art and that this application is intended to cover any adaptation or variation thereof, therefore, it is manifestly intended that this invention be only limited by the claims and the equivalent thereof.

I claim:

1. A roller assembly for laterally stretching a film of a synthetic orientable thermoplastic material which comprises:

first and second grooved rollers, said first and second grooved rollers being comprised of a first and second set of discs positioned on a mandrel, said first set of discs having a diameter larger than the diameter of said second set of discs, said first set of discs being positioned on said mandrel in interlocking relationship for rotational movement therewith, said first and second set of discs being held on said mandrel in a loosened state thereby to permit self-centering of said first set of discs during stretching, said first and second grooved rollers being placed in juxtaposition to form a nip and stretching grooves therebetween; and means for introducing said material into said nip of said grooved rollers.

2. The roller assembly as defined in claim 1 wherein the relative juxtapositioning of said grooved rollers is variable to permit adjustments in accordance with the material being treated.

3. The roller assembly as defined in claim 1 wherein the spacing between discs of each roller is varied thereby to permit self-centering of said first set of discs during stretching of said material in said roller assembly.

4. The groove roller assembly as defined in claim 1 wherein discs are positioned on said mandrel by a key.

5. The groove roller assembly as defined in claim 1 wherein said first set of discs of said grooved rollers are formed of metal and wherein said second set of discs of said grooved rollers are formed of an elastomer.

6. The groove roller assembly as defined in claim 1 wherein the thickness of said first set of discs is less than the thickness of said second set of discs.

7. The roller assembly as defined in claim 1 wherein said means for introducing said material into said nip of said grooved rollers is comprised of a roller for controlling the introduction of said material into said nip in a manner such that the velocity of introduction is substantially identical to the surface velocity of said grooved rollers.

8. The roller assembly as defined in claim 7 wherein said roller contacts one of said grooved rollers.

9. The roller assembly as defined in claim 7 wherein said roller means comprise a pair of press rollers.

* * * * *